United States Patent [19]

Yamada

[11] 4,163,605

[45] Aug. 7, 1979

[54] METHOD OF PICTURE REPRODUCTION WITH VARIABLE REPRODUCTION SCALE

[76] Inventor: Mitsuhiko Yamada, Ogurusukita-danchi #30-206, 6 Goto-cho, Ogurusu-minami, Fushimi-ku, Kyoto-shi, Japan

[21] Appl. No.: 815,174

[22] Filed: Jul. 13, 1977

[30] Foreign Application Priority Data

Jul. 20, 1976 [JP] Japan .................................. 51/86256

[51] Int. Cl.² ............................................. H04N 1/06
[52] U.S. Cl. ..................................... 358/287; 358/77; 358/80
[58] Field of Search .......................... 358/77, 80, 287

[56] References Cited

U.S. PATENT DOCUMENTS 3,272,918  9/1966  Koll et al. ........................... 358/287
3,541,245  11/1970  Wilby .................................. 358/287
3,956,583  5/1976  Pugsley ............................... 358/297
4,075,663  2/1978  Wellendorf .......................... 358/283

Primary Examiner—Robert L. Griffin
Assistant Examiner—Edward L. Coles

[57] ABSTRACT

A method of picture reproduction with variable reproduction scale. The original picture is scanned to obtain picture signals to be recorded, the picture signals are written into a memory with addressing in synchronization with timing pulses, and then the original picture is reproduced by reading out the picture signals from the memory. In this method a variable magnification scale can be obtained by compressing or elongating the picture signals with the use of insert pulses different from the usual timing pulses, the insert pulses being inserted among the timing pulses in proportion to the magnification scale required.

8 Claims, 4 Drawing Figures

METHOD OF PICTURE REPRODUCTION WITH VARIABLE REPRODUCTION SCALE

The present invention relates to a method of picture reproduction with variable reproduction scale, and more particularly to a method of picture reproduction using a color scanner, a facsimile producer and the like, with variable magnification scale between the original and the reproduction pictures by picture scanning and recording.

In the art of picture reproduction, many methods for changing magnification of the picture have been developed. Conventional methods for changing magnification in such picture reproducing methods include the following.

In, a first mechanical method, magnification is changed by using original picture and recording cylinders of different diameter. In this method, however, the ratio between the diameters of the two cylinders determines the magnification. Consequently, a different cylinder is required for each magnification factor. This means high cost, and the range of magnification factors is limited by the availability of cylinders.

In another mechanical method, magnification is changed by varying the relative rotation speeds of two cylinders instead of using cylinders of different diameter. In this case the ratio between such rotation speeds must be an integer so as to easily synchronize the phase of the original picture scanning system with the recording system with scanning. This means corresponding limitation of magnification factors. This defect has been removed by the use of a memory, resulting in a method of picture reproduction with variable reproduction scale, that is, in a method of picture reproduction comprising rotating simultaneously two cylinders for an original picture and a recording film, first storing picture signals picked up by scanning the original picture on the picture cylinder in the memory, and then recording or reproducing the picture onto the recording film on the recording cylinder by properly reading out the picture signals from the memory. In this system the magnification scale may be continuously varied by varying the frequency of the sampling pulses.

However, this method has disadvantages. Supposing that the reading out speed is defined, the number of sampling pulses or the frequencies for writing into the memory should be increased when enlarging. Accordingly, a special analog-digital converter having very wide frequency range and high converting speed disposed prior to the memory is required. However, such a converter is not available on the market, and a color correction circuit having wide frequency range is also required. This means high cost.

In accordance with the present invention, a method of picture reproduction with variable reproduction scale is provided, which is free from the above-mentioned defects of the prior art and comprises two rotating cylinders with a common axis for an original picture and a recording film, first storing picture signals picked up by scanning the original picture on the picture cylinder into a memory, and then reproducing the picture onto the recording film on the recording cylinder by reading out the picture signals from the memory, and inserting other pulses generated by a magnification scale set up means among address pulses for of the memory when reading out the picture signals from the memory or when writing the picture signals into the memory.

According to the present invention it is unnecessary to reduce or enlarge the basic timing pulse intervals in proportion to the reducing or enlarging magnification scale when writing and reading out the picture signals or from the memory. Hence, the increase of the frequency range does not extend to the whole machine. Further, there is no need to use any special high-speed analog-digital converter. Usual analog-digital converters on the market can be used in accordance with the present invention, and no wider frequency range of the color correction circuit prior to the memory is required. Consequently, a very economical picture reproduction method with variable reproduction scale can be provided according to the present invention.

In order that the invention may be better understood, one embodiment will now be described with reference to the accompanying drawings, in which.

Figure 1:
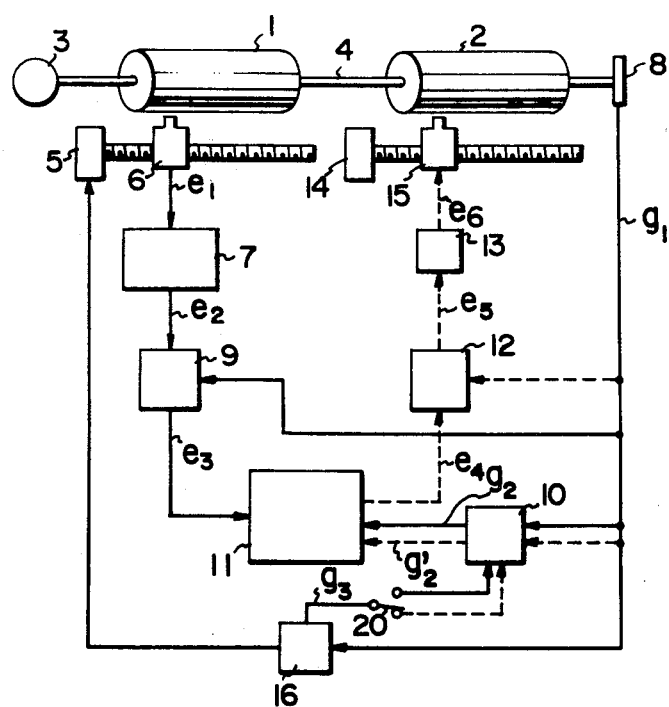
FIG. 1 is a block diagram of a method of picture reproduction with variable reproduction scale in accordance with the present invention.

Referring to the drawings, in FIG. 1, an original picture cylinder 1 and a recording film cylinder 2 are rotated by an electric motor 3 via a rotary shaft 4. An original picture on the original picture cylinder 1 is scanned in the right hand direction by a scanning head 6 moved in the direction of the cyinders' axis by an electric motor 5. Picture signals $e_1$, inlcuding unsharp signals and the like, converted into color separation signals by the scanning head 6, are fed to a color correction circuit 7. Then the color correction circuit 7 puts out corrected picture signals $e_2$.

The color correction circuit 7 includes a masking circuit correcting impurities of color ink components and a contrast compensating circuit and the like. Conventional color correction circuits, for example, used in scanners and the like can be used in the present invention. Hence, further description of such color correction circuits is unnecessary here.

The picture signals $e_2$ come from the color correction circuit 7 are changed to digital form in synchronization with regular timing pulses $g_1$ generated by a pulse generator 8 comprising a rotary encoder and so forth, and the rotary encoder is coaxially combined with the original picture and recording cylinders.

Firstly, when the reproducing magnification scale is unity, i.e., actual size, the picture signals $e_2$ are converted into digital picture signals $e_3$ in the analog-digital converter 9, hereinafter referred to as the A-D converter, in synchronization with the timing pulses $g_1$ coming from the pulse generator 8. Writing or storing of the digital picture signals $e_3$ into a memory 11 is performed according to writing address signals $g_2$ generated by an address signal generator 10, and the writing address signals $g_2$, in case of 1-1 scale, address memory locations with addresses the same as the serial numbers of the corresponding timing pulses $g_1$ following the start of scanning.

The memory has more than enough capacity to store the digital picture signals $e_3$ picked up by scanning the original picture in one cycle, that is, in one revolution circumference of the picture cylinder 1. In FIG. 1, the signal paths drawn in solid lines show the writing mode and the signal paths drawn in dotted lines show the reading mode.

In actual use two independent memory units 11 are provided and the input and output to them is switched by switching means so that reading of one line out from one memory unit and writing of the next line into the other memory unit are preformed simultaneously, and thus picture reproduction speed is twice what it would be if no such switching were performed. Therefore for alternate lines the switching system changes over the pair of memory units so that each is written into and is read out from alternately. However, for ease of explanation further mention of this duplexing of memory unit 11 will be omitted from this specification.

The reading process of the picture signals from the memory 11 is started by the start pulse corresponding to the start position of one cycle of reproduction. Reading out is performed in synchronization with reading out address signals $g_2'$ generated by the address signal generator 10, and the reading out address signals $g_2'$ address, the in the same manner as the writing in case of 1-1 scale, memory locations with addresses the same as the serial numbers of the corresponding timing pulses $g_1$ following the start of scanning. The memory 11 puts out digital reproduction picture signals $e_4$.

The digital reproductuon picture signals $e_4$ are changed to analog picture signals $e_5$ in a digital-analog converter 12, hereinafter referred to D-A converter, in synchronization with the timing pulses $g_1$, and then the analog picture signals $e_5$ are fed to an output control circuit 13.

The output control circuit 13 controls a light source of the recording head 15, and modulates its optical output. This recording head is moved in the right hand direction with the same speed, in case of 1-1 scale, as the scanning head 6 by an electric motor 14, in in unison with to the output picture signals $e_6$ of the output control circuit 13, so that the picture reproduction of actual size is obtained on the recording films.

As above-described, in case of 1-1, the writing and reading-out speeds of the picture signals into or from the memory 11 are controlled to be equal and the sliding speeds of both the heads are the same, and thereby the picture reproduction of actual 1-1 scale in both the longitudinal and the transverse directions is obtained. The recording picture signals $e_4$, $e_5$, and $e_6$ are, however, delayed precisely one cycle with respect to the scanning picture signals $e_1$, $e_2$, and $e_3$.

For reproducing the original picture on a reduced scale the scanning head 6 is advanced forward faster than the recording head 15 by the prescribed reduction scale, which is performed, for example, by controlling the rotational speed of the electric motor 5 by means of a magnification scale set-up means 16.

Figure 2:
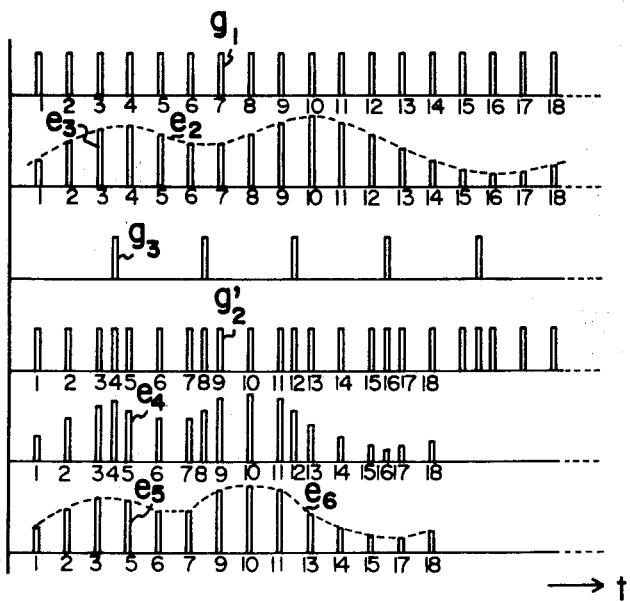
FIG. 2 is a time chart of electric signals when reproduction magnification scale is less than unity.

Further, FIG. 2 shows a time chart showing the signals for writing and reading out immediately after the respective starts, in which the synchronizing signals $g_1$ are shown in common.

In writing of the picture signals into the memory 11, the corrected analog picture signals $e_2$ coming from the color correction circuit 7 are converted into the digital picture signals $e_3$ in synchronization with the timing signals $g_1$ in the A-D converter 9 and then are stored in the memory 11.

Figure 3:
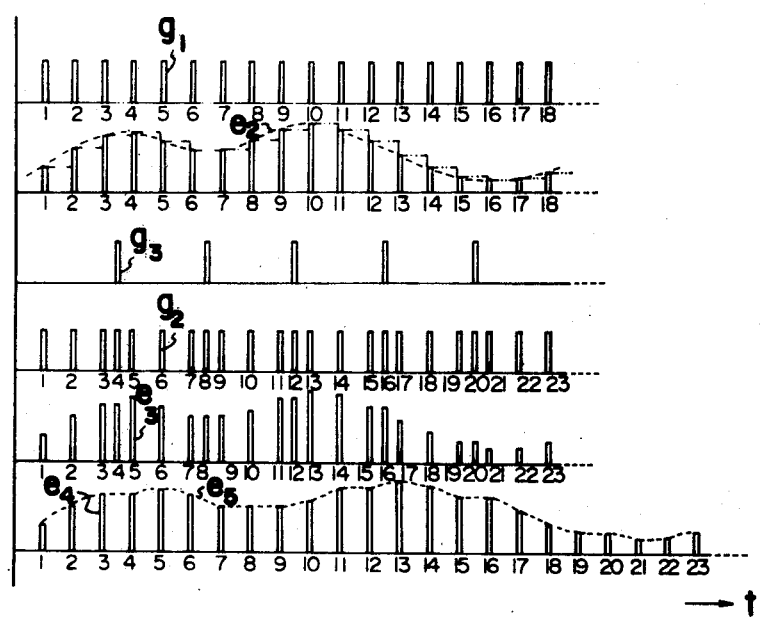
FIG. 3 is a time chart of electric signals when reproduction magnifiction scale is greater than unity.

Parenthetically, in FIG. 2 as well as FIG. 3, the digital picture signals $e_3$ are shown as bar samples of the analog picture signals $e_2$, but actually they consist of binary codes, and the reproduction digital picture signals $e_4$ are shown as well in this way.

Storing, i.e. writing of, the picture signals to be recorded into the memory 11 is performed in synchronization with the writing which address memory locations with addresses the same as the serial numbers of the corresponding timing pulses $g_1$ following the start of scanning.

On the other hand, in reading out, insert pulses $g_3$ produced by the magnification set up means 16 are inserted among the timing signals $g_1$ at intervals corresponding to the magnification scale, and then the address signal generator 10 puts out the different reading address signals $g_2'$ differing differ from those for writing.

The insert pulses $g_3$ serve to produce the address signals $g_2'$ which permit to advance, i.e., to increase by one, the address of the memory location addressed by the timing pulses of $g_1$ following the insert pulse of $g_3$, that is, to skip one address. Thereby the reproduction digital picture signals $e_4$ read out from the memory 11 are compressed or reduced with respect to the time axis, i.e., in the direction of the circumference of the recording cylinder.

The compressed reproduction digital picture signals $e_4$ are fed to the D-A converter 12 in which the signals $e_4$ read out by means of addressing by the extra insert pulses $g_3$ are not synchronized with the timing signals $g_1$. Consequently they cannot be converted into analog signals and so are erased. As a result, the reduced reproduction analog picture signals $e_5$ are obtained.

Alternatively, when the picture size is to be enlarged, in writing, the insert pulses $g_3$ generated by the magnification scale set up means 16 are fed to the address signal generator 10. The address signal generator 10 generates the address signals $g_2$ addressing the memory, as hereinbefore described. When the extra insert pulses $g_3$ are inserted among the timing signals $g_1$, the address pulses having the next address numbers are produced by the address signal generator according to the insert pulses $g_3$, and the same picture signals as the previous picture signals from the A-D converter 9 written to the memory locations addressed by the previous address signals are written to the next memory locations addressed by the newly produced address pulses.

That is, the A-D converter 9 samples the analog picture signals $e_2$ is synchronization with the timing signals $g_1$, converts them into the digital signals $e_3$ and holds these values until the next timing pulse of $g_1$ is supplied. During the hold of the digital signal $e_3$, two digital picture signals having the same value are written into the memory 11 with successive address numbers in synchronization with the two successive address signals $g_2$ by the address signal generator 10 according to the timing signal $g_1$ and the insert signal $g_3$.

Thus written picture signals into the memory 11 can be read out in synchronization with the reading out address signals $g_2'$ produced according to the timing signals $g_1$ alone. Thereby the reproduction digital picture signals $e_4$ are elongated with respect to the time axis.

The elongated reproduction digital picture signals $e_4$ are changed to analog picture signals $e_5$ in synchronization with the timing signals $g_1$ in the D-A converter 12. Hence, enlarged picture reproduction can be obtained.

The recording head 15 is moved faster than the scanning head 6 by the prescribed enlarged magnification scale which can be performed in the same manner as in the case of picture reduction by, for example, controlling the rotating speed of the electric motor 5 by means of the magnification scale set up means 16.

The insert pulses $g_3$ are inserted among the timing signals $g_1$ at regular intervals in proportion to the reducing and enlarging magnification scales. Therefore, in both the reducing and enlarging case, the magnification scale M is given by the ratio of the number of the writing address signals $g_2$ per unit time to the number of the reading out address signals $g_2'$ per unit time. That is, the equation is as follows:

$$M = g_2/g_2'$$

Figure 4:
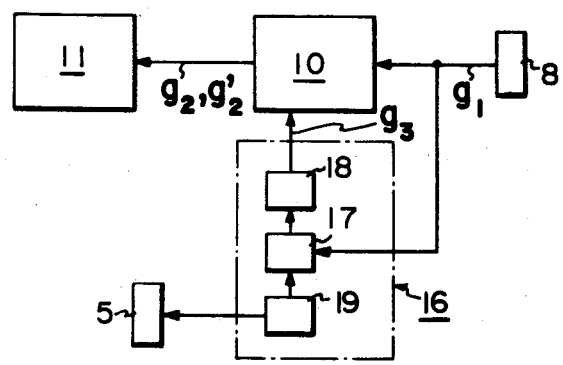
FIG. 4 is a block diagram of a magnification scale set up means of the method shown in FIG. 1.

In FIG. 4, the magnification scale set-up means 16 comprises a preset counter 17 counting the number of synchronous pulses $g_1$, an insert pulse generator 18 producing when a value counted by the preset counter 17 coincides with a preset value corresponding to the desired magnification scale, the insert pulses $g_3$ having proper wave forms and a magnification scale setting means 19 having a preset dial, the presetting dial presets required preset values to the preset counter 17 corresponding to the magnification scale.

Further, the magnification scale setting means 19 not only controls the traversing speed of the scanning head 6 according to the magnification scale set on the preset dial, but also selects whether the insert pulses $g_3$ put out from the pulse generater 18 are fed to the writing circuit unit or to the reading out circuit unit of the address signal generator 10 depending on whether the reproduction scale is greater or less than unity, which is shown in FIG. 1 by a turn switch 20 for convenience.

The relation of the preset value n of the preset counter 17 to the magnification scale M is determined as follows: M is equal to the ratio of the number of address signals $g_2$, $g_2'$ for writing and reading out, and one or the other of the address signals $g_2$, $g_2'$ is the same as the timing signal $g_1$. Accordingly, the following equations can be obtained:

Reducing scale: $g_2 = g_1$,
$M = g_2/g_2' = g_1/g_2' = n/(n+1)$

Enlarging scale: $g_2' = g_1$,
$M = g_2/g_2' = g_2/g_1 = (n+1)/n$

The equations mean that the preset counter 17 generates one insert pulse $g_3$ when it counts the number n of timing pulses $g_1$, and then the addition of one insert pulse $g_3$ to the number n of the counted timing pulses $g_1$ results in the number (n+1) of address signals $g_2$ or $g_2'$. Thereby the ratio n to (n+1) determines the magnification M. In FIG. 2 for reducing scale, for example, the preset number n is three, and hence the magnification scale is ¾, and in FIG. 3 for enlarging scale the magnification scale is 4/3.

What is claimed is:

1. In a picture reproducing method comprising scanning an original picture to obtain picture signals to be recorded, correcting impurities of color ink components, generating timing pulses in synchronism to a scanning speed, writing the picture signals into a memory including addressing said memory in synchronization with the timing pulses, reading out the picture signals from the memory including addressing said memory in synchronization with the timing pulses, and recording the reproduction picture from the picture signals read out from the memory; a method of varying reproduction scale, wherein either one of said steps of writing in or reading out memory address signals includes the step of addressing said memory with additional address signals synchronized to other pulses different from the timing pulses, said other pulses being inserted among the timing pulses without changing a base frequency of said timing pulses.

2. A picture reproducing method with variable reproduction scale according to claim 1, wherein said other pulses are insert pulses generated by a magnification scale set-up means.

3. A picture reproducing method with variable reproduction scale according to claim 2, wherein said insert pulses are inserted among the timing signals at regular intervals in proportion to the magnification scale.

4. A picture reproducing method with variable reproduction scale according to claim 2, wherein said magnification scale set-up means comprises a preset counter, an insert pulses generator responsive to said preset counter, and a magnification scale setting means having a preset dial for presetting said preset counter.

5. A picture reproducing method with variable reproduction scale according to claim 4, wherein said magnification scale set-up means not only controls the travel speed of the scanning head as determined by the magnification scale fixed on the preset dial, but also selects whether the insert pulses are fed to a writing in or to a reading out circuit unit of the address signal generator, corresponding to the enlarging or the reducing magnification scales.

6. In a picture reproducing method comprising scanning an original picture to obtain picture signals to be recorded, correcting impurities of color ink components of the picture, generating timing pulses corresponding to a scanning speed, writing the picture signals into a memory including addressing said memory in synchronization with the timing pulses, reading out the picture signals from the memory including addressing said memory in synchronization with the timing pulses, and recording the original picture from the picture signals read out from the memory; a method of providing enlarged picture reproduction by generating insert pulses, addressing the memory in synchronization with the timing pulses and the insert pulses, the insert pulses being inserted among the timing pulses after every predetermined number of the timing pulses, said predetermined number being in proportion to a desired enlargement scale when writing into the memory, writing the same picture signals as previous picture signals to addresses addressed by the insert pulses, and reading out from the memory by addressing the memory in synchronization with only said timing pulses.

7. In a picture reproducing method comprising scanning an original picture to obtain picture signals to be recorded, correcting impurities of color ink components of the original picture, generating timing pulses corresponding to a scanning speed, writing the picture signals into a memory including addressing the memory in synchronization with certain pulses, reading out the picture signals from the memory with addressing in synchronization with the timing pulses, and recording the original picture from the picture signals read out from the memory; a method of obtaining reduced picture reproduction by generating insert pulses, addressing the memory in synchronization with the timing pulses and insert pulses, said insert pulses being inserted among the timing pulses every predetermined number of the timing pulses, some of said insert pulses being not in synchronization to the timing pulses, said predetermined number being in proportion to the desired reduction scale when reading out from the memory, erasing the picture signals read out from the addresses addressed by ones of said insert pulses not in synchronization with the timing pulses, and writing into the memory including addressing in synchronization with only the timing pulses.

8. In a picture reproducing system comprising means for scanning an original picture to obtain picture signals to be recorded, means for correcting impurities of color ink components of the original picture, means for generating timing pulses corresponding to a scanning speed, means for writing the picture signals into a memory including addressing said memory in synchronization with the timing pulses, means for reading out the picture signals from the memory including addressing said memory in synchronization with the timing pulses, and recording the reproduction picture from the picture signals read out from the memory; a circuit for varying a reproduction scale, comprising means associated with said writing means or said reading means for addressing said memory with additional address signals synchronized to other pulses different from the timing pulses; and means for inserting the other pulses among the timing pulses without changing a base frequency of said timing pulses.

* * * * *